(12) United States Patent
Hori et al.

(10) Patent No.: US 12,442,380 B2
(45) Date of Patent: Oct. 14, 2025

(54) BLOWER AND VACUUM CLEANER

(71) Applicant: NIDEC CORPORATION, Kyoto (JP)

(72) Inventors: Ryuhei Hori, Kyoto (JP); Hiroki Yokozawa, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 18/783,341

(22) Filed: Jul. 24, 2024

(65) Prior Publication Data

US 2025/0043791 A1 Feb. 6, 2025

(30) Foreign Application Priority Data

Jul. 31, 2023 (JP) ................. 2023-124965

(51) Int. Cl.
*F04D 29/04* (2006.01)
*A47L 5/22* (2006.01)
*F04D 25/06* (2006.01)

(52) U.S. Cl.
CPC .............. *F04D 25/062* (2013.01); *A47L 5/22* (2013.01); *F04D 25/0646* (2013.01)

(58) Field of Classification Search
CPC .............. F04D 29/046; F04D 29/0476; F04D 29/0473; F04D 29/002; F04D 29/056; F04D 29/0563; F04D 19/04; F04D 19/042; F04D 19/048; F04D 25/0646; F04D 25/062; A47L 5/22
See application file for complete search history.

(56) References Cited

U.S. PATENT DOCUMENTS

2020/0217330 A1* 7/2020 Fujiwara ............. F04D 29/4226
2021/0348616 A1* 11/2021 Hwang ................ F04D 29/057

FOREIGN PATENT DOCUMENTS

CN 106849412 A 6/2017

* cited by examiner

*Primary Examiner* — Nathaniel E Wiehe
*Assistant Examiner* — Maxime M Adjagbe
(74) *Attorney, Agent, or Firm* — HAUPTMAN HAM, LLP

(57) ABSTRACT

A blower includes a motor having a shaft and a stator, an impeller connected to and rotating about the shaft, a first housing between the motor and impeller, and a second housing opposite to the first housing across the motor. The second housing includes a bearing holding portion holding a bearing of the shaft, a stator holding portion outside the bearing holding portion and holding the stator, and a coupling portion coupling the bearing holding portion and stator holding portion. The dimension in the axial direction of the shaft is a first dimension and the dimension in the circumferential direction of the shaft is a second dimension among dimensions of the end portion of the coupling portion on the bearing holding portion side. The first dimension is smaller than the second dimension. A portion of the coupling portion has a dimension in the axial direction smaller than the first dimension.

19 Claims, 10 Drawing Sheets

BLOWER AND VACUUM CLEANER

CROSS-REFERENCE TO RELATED APPLICATIONS

The present invention claims priority under 35 U.S.C. § 119 to Japanese Patent Application No. 2023-124965 filed on Jul. 31, 2023, the entire content of which is incorporated herein by reference.

FIELD OF THE INVENTION

The present disclosure relates to a blower and a vacuum cleaner.

BACKGROUND

Conventionally, as a housing structure of a motor mounted on a blower, a structure in which the motor is sandwiched from both sides in an axial direction using two housing members is known. In the blower having such a structure, as the motor rotates, an airflow that flows into the housing from the housing member on one side in the axial direction and cools the motor is formed.

The housing member in the conventional structure has a relatively large area in a plan view, and tends to obstruct the above-described cooling flow. Although it is conceivable to reduce the area of the housing member in order to take in more cooling flow, if the area of the housing member is simply reduced, the rigidity of the housing member decreases, and there is a possibility that vibration and noise of the housing member are generated when the motor rotates.

Therefore, there is room for improvement in terms of enhancing the cooling effect of the motor while securing the rigidity of the housing.

SUMMARY

An exemplary blower according to an aspect of an embodiment includes a motor, an impeller, a first housing, and a second housing. The motor includes a rotor having a shaft, and a stator disposed on the radially outer side of the rotor. The impeller is connected to the shaft and rotates about the shaft. The first housing is disposed between the motor and the impeller. The second housing is disposed on a side opposite to the first housing across the motor. The second housing includes a bearing holding portion, a stator holding portion, and a coupling portion. The bearing holding portion holds a bearing of the shaft. The stator holding portion is disposed on the outer side of the bearing holding portion in the radial direction of the shaft, and holds the stator. The coupling portion connects the bearing holding portion and the stator holding portion. Assuming that a dimension in the axial direction of the shaft is a first dimension and a dimension in the circumferential direction of the shaft is a second dimension among the dimensions of the end portion of the coupling portion on the bearing holding portion side, the first dimension is smaller than the second dimension, and the coupling portion has a portion whose dimension in the axial direction is smaller than the first dimension.

The above and other elements, features, steps, characteristics and advantages of the present disclosure will become more apparent from the following detailed description of the preferred embodiments with reference to the attached drawings.

DETAILED DESCRIPTION

Figure 1:
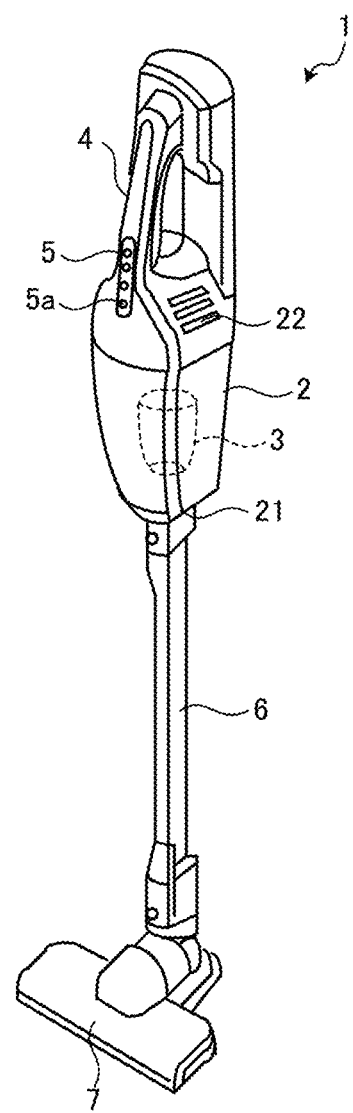
FIG. 1 is a perspective view of a vacuum cleaner according to an embodiment.

Hereinafter, modes for implementing a blower and a vacuum cleaner according to the present disclosure (hereinafter, described as "embodiments") will be described in detail with reference to the drawings. Note that the present disclosure is not limited by these embodiments. In addition, each embodiment can be appropriately combined within a range in which the processing contents do not contradict each other. In the following embodiments, the same parts are denoted by the same reference numerals, and redundant description will be omitted.

In the embodiments described below, expressions such as "constant", "orthogonal", "vertical", or "parallel" may be used, but these expressions do not need to be strictly "constant", "orthogonal", "vertical", or "parallel". That is, it is assumed that each expression described above allows deviation in manufacturing accuracy, installation accuracy, and the like, for example.

In the following embodiment, a direction parallel to a central axis C (see FIG. 2) of a blower 3 is referred to as an "axial direction", a direction orthogonal to the central axis C of the blower 3 is referred to as a "radial direction", and a direction along an arc centered on the central axis C of the blower 3 is referred to as a "circumferential direction".

In the following embodiment, for easy understanding, the upper side (Z-axis positive direction side) of the blower 3 in FIG. 2, that is, the side on which an impeller 30 is disposed, is referred to as an "upper side" of the blower 3. Note that the blower 3 is mounted on a vacuum cleaner 1 with the upper side, that is, the impeller 30 side, facing downward. This positional relationship is merely used for description, and does not limit the actual positional relationship and direction in the blower 3 and the vacuum cleaner 1.

Furthermore, in each of the drawings to be referred to below, an orthogonal coordinate system in which a Z-axis direction is defined and a Z-axis positive direction is a vertically upward direction may be illustrated for easy understanding of the description.

First, a configuration of a vacuum cleaner 1 to which a blower 3 according to an embodiment is applied will be described with reference to FIG. 1. FIG. 1 is a perspective view of the vacuum cleaner 1 according to the embodiment.

As illustrated in FIG. 1, the vacuum cleaner 1 includes the blower 3. The vacuum cleaner 1 is a so-called stick-type vacuum cleaner. The vacuum cleaner 1 includes a rechargeable battery (not illustrated), and is operated by the power supplied from the battery. However, the vacuum cleaner 1 may have a power cord, and operate by the power supplied via the power cord connected to a power outlet provided on a wall surface of a living room. The vacuum cleaner 1 including the blower 3 is not limited to the stick type, and may be another type of vacuum cleaner such as a so-called robot type, a canister type, or a handy type.

The vacuum cleaner 1 includes a housing 2. The housing 2 includes an intake portion 21 and an exhaust portion 22. An air passage (not illustrate) connecting the intake portion 21 and the exhaust portion 22 is formed in the housing 2. In the air passage, a dust collecting portion (not illustrated), a filter (not illustrated), and the blower 3 are arranged sequentially from the intake portion 21 toward the exhaust portion 22. The blower 3 is disposed in the housing 2 with the impeller 30 side facing the intake portion 21. The blower 3 rotates the impeller 30 to generate an airflow from the intake portion 21 toward the exhaust portion 22 in the housing 2. Dirt, such as dust, contained in air flowing in the inside of the air passage is captured by the filter, and is collected in the inside of the dust collecting portion formed in the shape of a container. The dust collecting portion and the filter are provided to be detachable from the housing 2.

A grip portion 4 and an operation unit 5 are provided on the upper part of the housing 2. A user can hold the grip portion 4 and move the vacuum cleaner 1. The operation unit 5 has a plurality of buttons 5a. The user sets the operation of the vacuum cleaner 1 by operating the buttons 5a. For example, a drive start, a drive stop, and a change of rotational speed of the blower 3 are instructed by the operation of the buttons 5a. A rod-shaped suction tube 6 is connected to a lower part of the housing 2. In other words, the housing 2 is connected to one end of the suction tube 6. A suction nozzle 7 is detachably attached to the other end of the suction tube 6. The other end of the suction tube 6 is the lower end of the suction tube 6 in FIG. 1.

Next, a configuration of the blower 3 according to the embodiment will be described with reference to FIG. 2. FIG. 2 is a vertical cross-sectional view of the blower 3 according to the embodiment. Specifically, FIG. 2 shows a longitudinal cross section obtained by cutting the blower 3 in a cross section passing through the central axis C.

Figure 2:
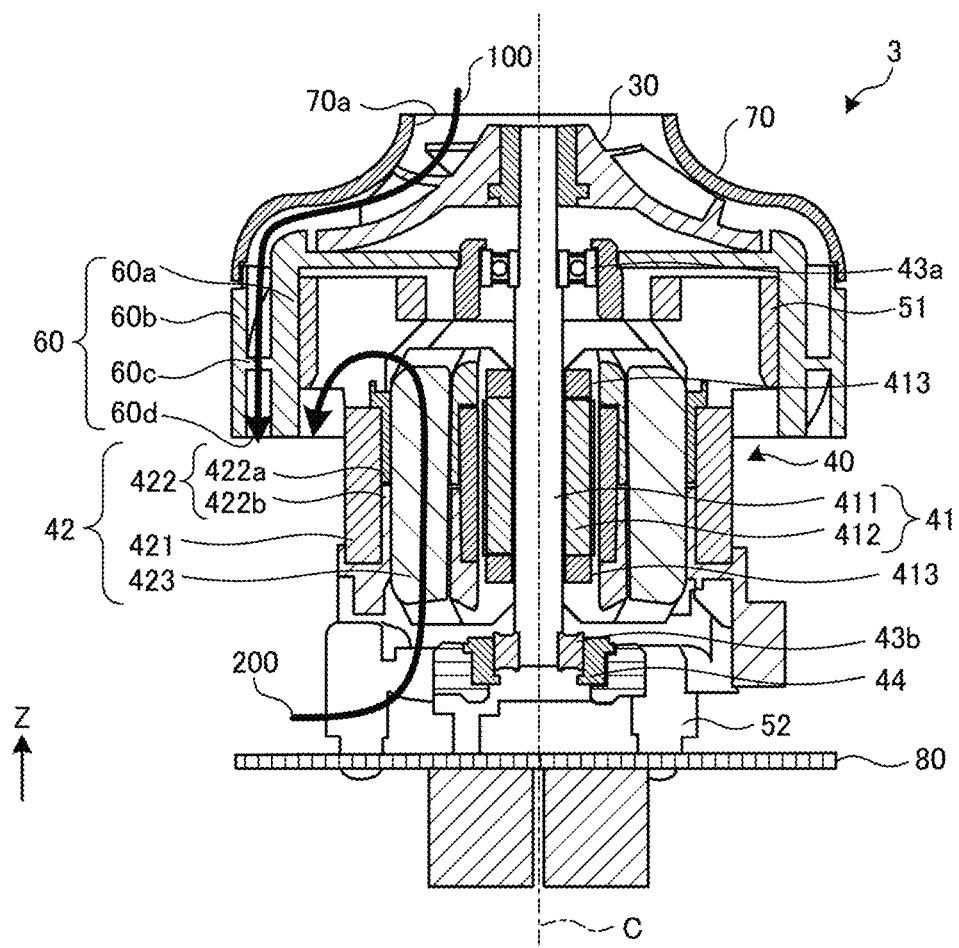
FIG. 2 is a longitudinal cross-sectional view of the blower according to the embodiment.

As illustrated in FIG. 2, the blower 3 includes an impeller 30, a motor 40, a housing 50, a diffuser 60, an impeller cover 70, and a circuit board 80.

The impeller 30 is disposed axially above the motor 40. The impeller 30 is connected to a shaft 411 described later. The impeller 30 rotates about the shaft 411 by the motor 40. The impeller 30 can be made of, for example, resin or metal. The radially outer edge of the impeller 30 has a circular shape in a plan view from the axial direction.

The motor 40 includes a rotor 41 and a stator 42. The motor 40 further includes a bearing 43.

The rotor 41 includes a shaft 411 and a magnet 412. The shaft 411 is disposed along the central axis C extending vertically. That is, the motor 40 includes the shaft 411 disposed along the central axis C. The shaft 411 is a columnar member made of metal, for example. The impeller 30 is fixed to the peripheral surface of the upper end portion of the shaft 411. A second bearing 43b to be described later is fixed to the peripheral surface of the lower end of the shaft 411.

The magnet 412 has a cylindrical shape. The magnet 412 is disposed on the radially outer side of the shaft 411 and is fixed to the shaft 411. The N poles and the S poles of the magnet 412 are alternately arranged in the circumferential direction on the radially outer surface of the magnet 412. Spacers 413 are disposed on both end surfaces of the magnet 412 in the axial direction.

The stator 42 is an armature that generates a magnetic flux according to the drive current. The stator 42 radially faces the rotor 41. In the present embodiment, the stator 42 is disposed on the radially outer side relative to the rotor 41. The stator 42 further includes a stator core 421 and an insulator 422. The stator 42 includes a coil 423.

Figure 3:
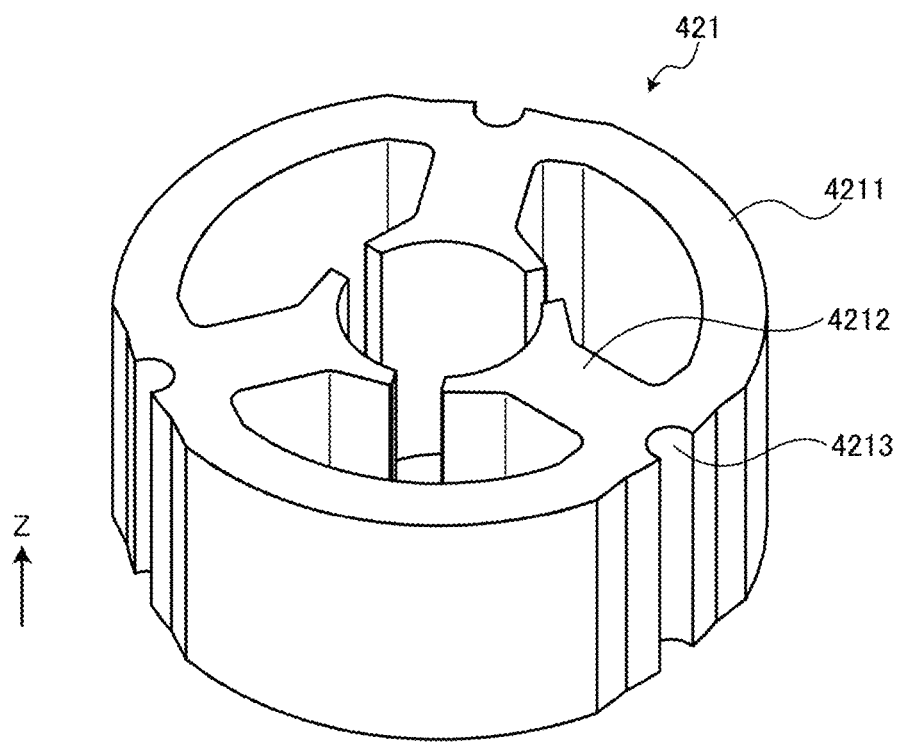
FIG. 3 is a perspective view of a stator core according to the embodiment.

The stator core 421 is a stacked body in which electromagnetic steel sheets are stacked in the axial direction. However, the stator core 421 may be a single member configured of, for example, firing and casting powder. The stator core 421 may be formed by joining a plurality of core pieces. Here, the configuration of the stator core 421 according to the embodiment will be described with reference to FIG. 3. FIG. 3 is a perspective view of the stator core 421 according to the embodiment.

As illustrated in FIG. 3, the stator core 421 includes a core back 4211 and a plurality of teeth 4212. The core back 4211 has a tubular shape centered on the central axis C (see FIG. 2). The teeth 4212 extend radially inward from the core back 4211. The plurality of teeth 4212 are arranged in the circumferential direction. In the present embodiment, the number of teeth 4212 is three. The three teeth 4212 are arranged at equal intervals in the circumferential direction. Note that the number of teeth 4212 is not limited to three. A slot is provided between the teeth 4212 adjacent to each other in the circumferential direction. The coil 423 is disposed in the slot.

A plurality of notches 4213 are formed in the core back 4211. The notch 4213 penetrates the core back 4211 in the axial direction. The notch 4213 is disposed radially outer side of the teeth 4212. The number of notches 4213 is the same as the number of teeth 4212. In the present embodiment, the number of notches 4213 is three. However, the number of notches 4213 is not limited to three. For example, the number of notches 4213 may be different from the number of teeth.

The insulator 422 covers at least a portion of the stator core 421. The insulator 422 is made of, for example, an insulating member such as a resin. In the present embodiment, the insulator 422 includes a first insulator 422a and a second insulator 422b. The first insulator 422a covers the stator core 421 from above. The second insulator 422b covers the stator core 421 from below. However, the insulator 422 may be integrated with the stator core 421 by insert molding.

In the present embodiment, the radially outer end surface of the core back 4211 and the radially inner end surfaces of the teeth 4212 are exposed without being covered with the insulator 422.

The coil 423 is formed by winding a conductive wire around the stator core 421 via the insulator 422. Specifically, the coil 423 is configured by winding a conductive wire around each of the teeth 4212 via the insulator 422. That is, the stator 42 includes a plurality of the coils 423. The plurality of coils 423 are arranged in a circumferential direction. In the present embodiment, the number of coils 423 is three (see FIG. 6). However, the number of coils 423 is not limited to three.

The bearing 43 rotatably supports the rotor 41 around the central axis C with respect to the stator 42. In the present embodiment, the bearing 43 includes a first bearing 43*a* and a second bearing 43*b*. The first bearing 43*a* is disposed axially above the stator 42. In other words, the first bearing 43*a* is disposed between the shaft 411 and the impeller 30. The second bearing 43*b* is disposed below the stator 42 in the axial direction. Specifically, the second bearing 43*b* is fixed to the peripheral surface of the lower end of the shaft 411 as described above.

The first bearing 43*a* and the second bearing 43*b* are, for example, rolling bearings. The first bearing 43*a* and the second bearing 43*b* as rolling bearings each have an inner ring (not illustrated) and an outer ring (not illustrated). The inner ring is disposed on the radially outer side of the shaft 411 and is fixed to the shaft 411. The outer ring is disposed on the radially outer side with respect to the inner ring, and is fixed to the first housing 51 or the second housing 52. A rolling member (not illustrated) such as a ball is disposed between the inner ring and the outer ring in the radial direction. The inner ring is rotatably provided with respect to the outer ring. The number and the type of the bearings 43 may be changed from the configuration of the present embodiment. The motor 40 may include a sleeve bearing or the like instead of the rolling bearing.

The housing 50 surrounds at least a part of the motor 40. The housing 50 is made of metal such as aluminum. However, the housing 50 may be made of a material other than metal such as resin. In the present embodiment, the housing 50 includes a first housing 51 and a second housing 52. The first housing 51 is disposed between the motor 40 and the impeller 30, and covers an axially upper portion of the motor 40. The second housing 52 is disposed below the motor 40 in the axial direction on the side opposite to the first housing 51 across the motor 40. Detailed configurations of the first housing 51 and the second housing 52 will be described later.

The diffuser 60 is disposed below the impeller 30 in the axial direction. The diffuser 60 is a member that surrounds the upper side and the radially outer side of the first housing 51, and is fixed to the first housing 51 by a fixing tool (not illustrated) such as a bolt.

The diffuser 60 has two tubular members (described as an "inner peripheral side cylindrical portion 60*a*" and an "outer peripheral side cylindrical portion 60*b*", respectively) arranged concentrically around the central axis C. The gap between the inner peripheral side cylindrical portion 60*a* and the outer peripheral side cylindrical portion 60*b* functions as a part of the gas flow path, and the lower end of the gap in the axial direction is the outlet of the flow path, that is, a gas exhaust port 60*d*. A plurality of stator blades 60*c* are provided in the gap between the inner peripheral side cylindrical portion 60*a* and the outer peripheral side cylindrical portion 60*b*. The inner peripheral side cylindrical portion 60*a* and the outer peripheral side cylindrical portion 60*b* are connected by a plurality of stator blades 60*c*.

Since the blower 3 includes the diffuser 60, the airflow circulating in the blower 3 can be rectified to smoothly circulate the airflow. The diffuser 60 may be made of resin or metal, for example.

The impeller cover 70 is a member surrounding the radially outer side of the impeller 30. The impeller cover 70 can be made of, for example, resin or metal. The impeller cover 70 has a tubular shape tapered upward about the central axis C. The radially inner surface of the impeller cover 70 contacts the radially outer surface of the diffuser 60. The impeller cover 70 is fixed to the diffuser 60.

The impeller cover 70 forms a gas flow path together with the diffuser 60. In other words, the diffuser 60 and the impeller cover 70 are examples of the flow path forming members. The impeller cover 70 has an intake port 70*a* at an end on one side in the axial direction.

The circuit board 80 is located on the side opposite to the motor 40 across the second housing 52. The circuit board 80 is fixed to the second housing 52. Specifically, the circuit board 80 is fixed to a plurality of board holding portions 523 of the second housing 52. Circuits for driving the motor 40, such as a power supply circuit and a control circuit, are formed on the circuit board 80.

In the blower 3 configured as described above, with the rotation of the impeller 30, an airflow 100 that flows in from the intake port 70*a* of the impeller cover 70 and is discharged from the exhaust port 60*d* of the diffuser 60 is formed.

Furthermore, in the blower 3, an airflow 200 is formed in addition to the airflow 100. The airflow 200 flows in from the gap between the coupling portions 524 of the second housing 52, passes through the gap between the teeth 4212 of the stator core 421, and flows out from the gap between the stator 42 and the first housing 51. The airflow 200 is, for example, an airflow generated according to a negative pressure generated by the airflow 100. The airflow 200 functions as cooling air for cooling the circuit board 80 and the motor 40.

Figure 4:
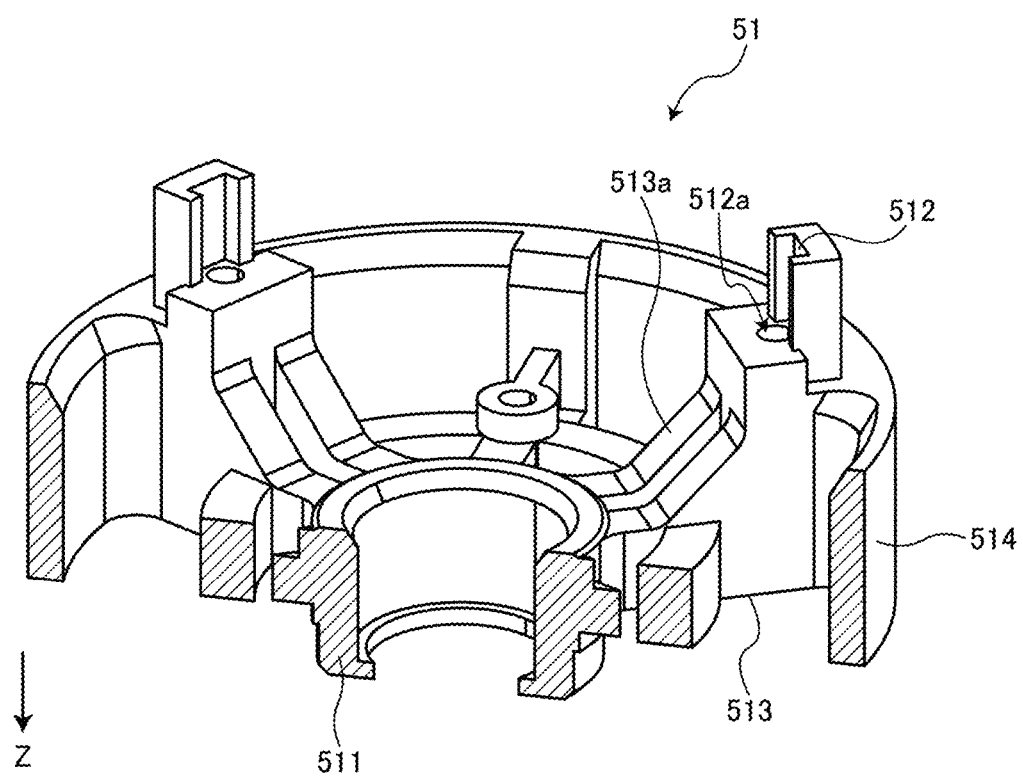
FIG. 4 is a perspective cross-sectional view of a first housing according to the embodiment.

Next, a configuration of the first housing 51 according to the embodiment will be described with reference to FIG. 4. FIG. 4 is a perspective cross-sectional view of the first housing 51 according to the embodiment. As illustrated in FIG. 4, the first housing 51 includes a bearing holding portion 511, a stator holding portion 512, a coupling portion 513, and a connecting portion 514.

The bearing holding portion 511 holds the first bearing 43*a* of the motor 40. The bearing holding portion 511 is a tubular portion extending axially. The first bearing 43*a* is disposed on the radially inner side of the bearing holding portion 511. The stator holding portion 512 is disposed on the radially outer side of the bearing holding portion 511 and holds the stator 42. The plurality of (here, three) stator holding portions 512 are arranged at equal intervals in the circumferential direction. The number of the stator holding portions 512 may be the same as that of the stators 42, and is not necessarily three.

The coupling portion 513 connects the bearing holding portion 511 and the stator holding portion 512. The number of the coupling portions 513 is the same as the number of the stator holding portions 512. The plurality of coupling portions 513 are arranged at equal intervals in the circumferential direction. In the present embodiment, the number of the coupling portions 513 is three, but the number of the coupling portions 513 is not limited to three. The coupling portion 513 has a rib 513*a* protruding from an axial end surface.

The connecting portion 514 is positioned on the radially outer side of the stator holding portion 512. The connecting portion 514 is a cylindrical portion extending in the axial direction. The radially outer surface of the connecting portion 514 is in contact with the diffuser 60 (see FIG. 2).

Figure 5:
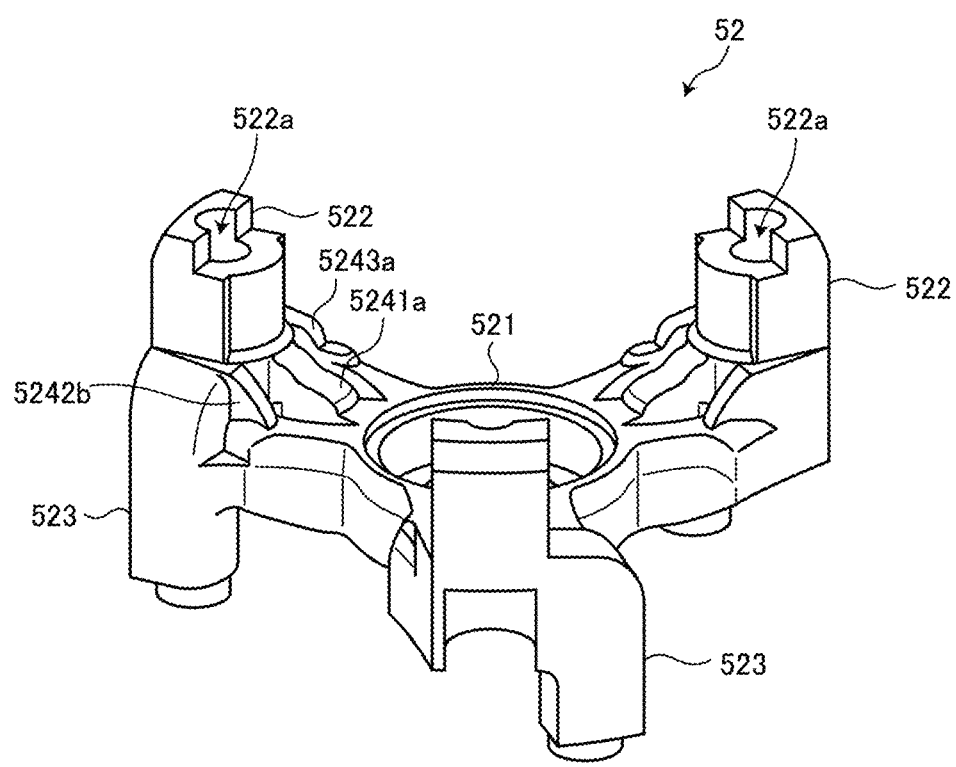
FIG. 5 is a perspective view of a second housing according to the embodiment.
Figure 6:
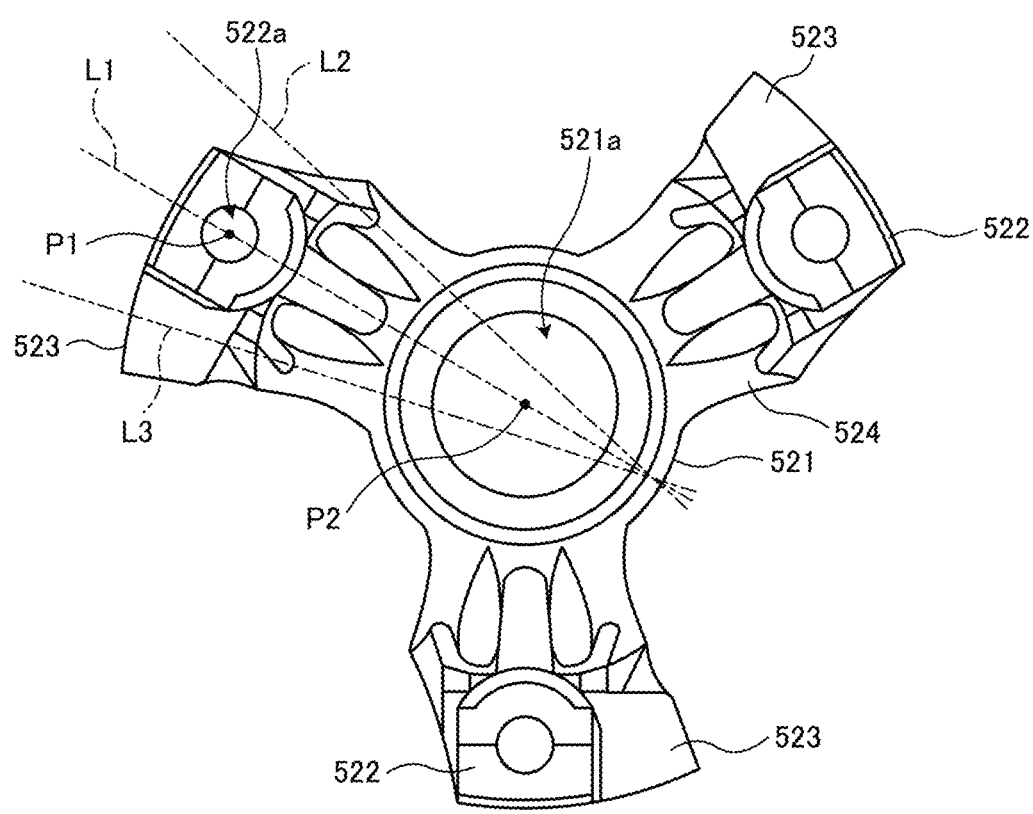
FIG. 6 is a plan view of the second housing according to the embodiment.
Figure 7A:
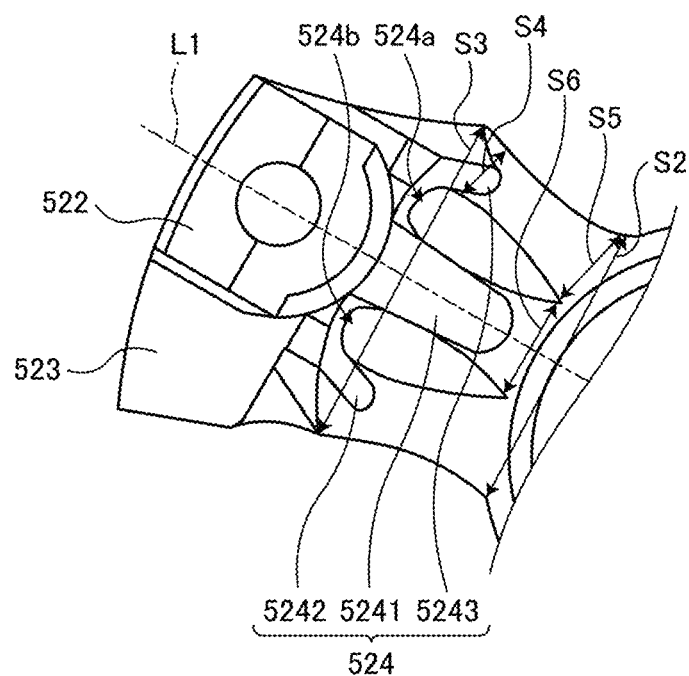
FIG. 7A is an enlarged plan view of the second housing according to the embodiment.
Figure 7B:
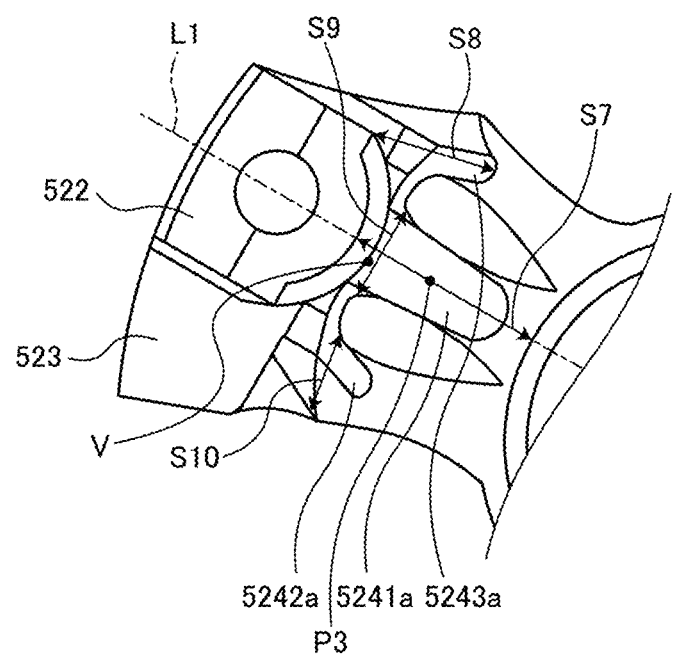
FIG. 7B is an enlarged plan view of the second housing according to the embodiment.
Figure 8:
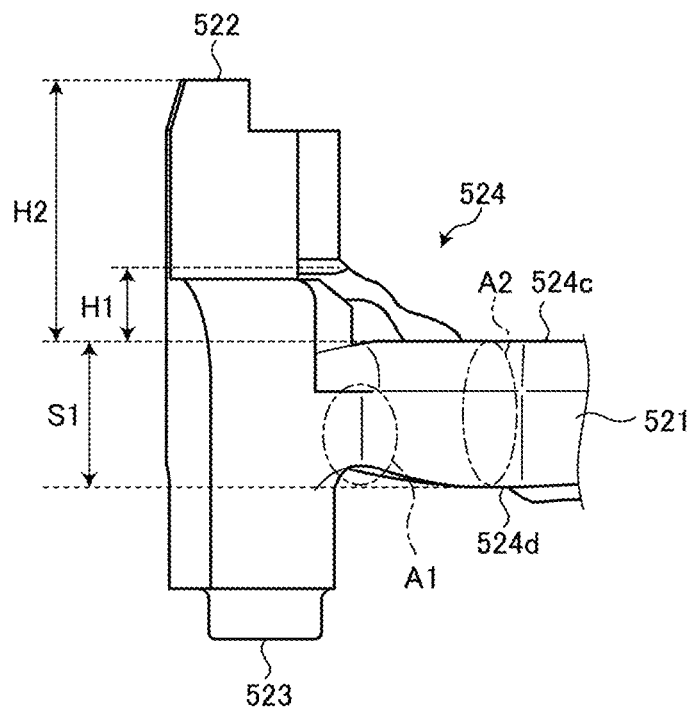
FIG. 8 is an enlarged side view of the second housing according to the embodiment.
Figure 9:
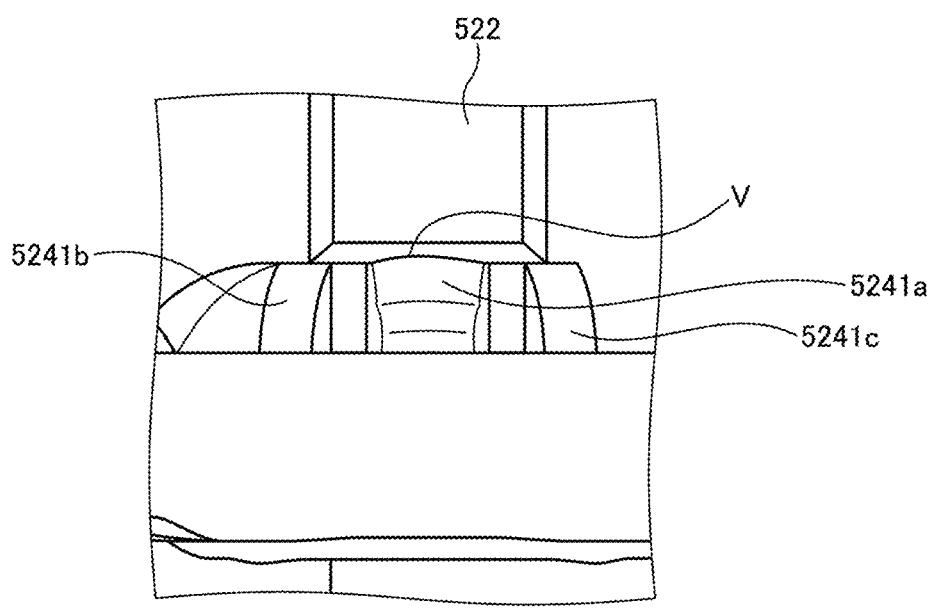
FIG. 9 is an enlarged side view of the second housing according to the embodiment.

Next, a configuration of the second housing 52 according to the embodiment will be described with reference to FIGS. 5 to 9. FIG. 5 is a perspective view of the second housing 52 according to the embodiment. FIG. 6 is a plan view of the second housing 52 according to the embodiment. FIGS. 7A and 7B are plan views of the second housing 52 according to the embodiment. FIGS. 8 and 9 are enlarged side views of the second housing 52 according to the embodiment.

As illustrated in FIGS. 5 and 6, the second housing 52 includes a bearing holding portion 521, a stator holding portion 522, a board holding portion 523, and a coupling portion 524.

The bearing holding portion 521 holds the second bearing 43b of the motor 40. The bearing holding portion 521 is a tubular portion having a through hole 521a extending in the axial direction. A bush 44 (see FIG. 2) is disposed on the radially inner side of the bearing holding portion 521. The second bearing 43b is supported by the radially inner surface of the bush 44. In a plan view of the second housing 52, the radius of the bearing holding portion 521 is, for example, 8 cm. The radius of the bearing holding portion 521 may be larger than 8 cm or smaller than 8 cm.

The stator holding portion 522 is disposed on the radially outer side of the bearing holding portion 521 and holds the stator 42. The stator holding portion 522 is a pedestal portion that supports the lower surface and the radially outer surface of the stator core 421 of the stator 42. The stator holding portion 522 has a through hole 522a extending in the axial direction. A bolt (not illustrated) is inserted into the through hole 522a. The bolt is also inserted into the through hole 512a (see FIG. 4) of the stator holding portion 512 of the first housing 51. The first housing 51 and the second housing 52 are fastened by bolts, whereby the motor 40 sandwiched between the first housing 51 and the second housing 52 is fixed. The bolt is disposed in the notch 4213 (see FIG. 3) of the stator core 421. As a result, positional displacement of the motor 40 is suitably suppressed.

As illustrated in FIG. 5, the plurality of (here, three) stator holding portions 522 are arranged at equal intervals in the circumferential direction. The number of the stator holding portions 522 is not limited to three. The board holding portion 523 holds the circuit board 80. The board holding portion 523 is disposed at a position shifted in the circumferential direction with respect to the stator holding portion 522. The number of the board holding portions 523 is the same as the number of the stator holding portions 522. In the present embodiment, the number of the board holding portions 523 is three, but the number of the board holding portions 523 is not limited to three.

The coupling portion 524 connects the bearing holding portion 521 and the stator holding portion 522. The number of the coupling portions 524 is the same as the number of the stator holding portions 522. The plurality of coupling portions 524 are arranged at equal intervals in the circumferential direction. In the present embodiment, the number of the coupling portions 524 is three, but the number of the coupling portions 524 is not limited to three.

Here, from the viewpoint of efficiently supplying the airflow 200 (see FIG. 2) to the motor 40, the area of the second housing 52 in a plan view is preferably small. Specifically, the area of the second housing 52 in a plan view is preferably small because more flow paths for the airflow 200 can be secured when the area of the second housing 52 in a plan view is small. On the other hand, when the area of the second housing 52 is reduced, the rigidity of the second housing 52 is reduced, and vibration and noise of the second housing 52 may be generated when the motor 40 rotates.

Therefore, in the second housing 52 according to the embodiment, assuming that a dimension in the axial direction is a first dimension S1 and a dimension in the circumferential direction is a second dimension S2 among the dimensions at the end portion of the coupling portion 524 on the bearing holding portion 521 side, the first dimension S1 is smaller than the second dimension S2. In addition, the second housing 52 in the embodiment has a portion A1 in which the dimension in the axial direction of the coupling portion 524 is smaller than the first dimension S1.

As described above, by relatively increasing the first dimension S1, it is possible to improve the strength on the bearing holding portion 521 side that is susceptible to vibration when the motor 40 rotates, and it is possible to reduce vibration when the motor 40 rotates. Therefore, it is possible to enhance the cooling effect of the motor 40 while securing the rigidity of the second housing 52. In addition, by providing a portion where the dimension in the axial direction is smaller than the first dimension S1 in the coupling portion 524, the weight of the second housing 52 can be reduced as compared with the case where the dimension in the axial direction is unified to the first dimension S1. Further, by making the first dimension S1 smaller than the second dimension S2, the height dimension of the second housing 52 can be suppressed.

Specifically, as illustrated in FIG. 8, the dimension of the coupling portion 524 in the axial direction increases toward an end A2 on the bearing holding portion 521 side. The lower surface 524d of the coupling portion 524 is curved in an arch shape such that the dimension of the coupling portion 524 in the axial direction increases toward the end A2 on the bearing holding portion 521 side within the dimension range of the bearing holding portion 521. More specifically, the lower surface 524d of the coupling portion 524 is curved so as to protrude axially downward toward the end A2 on the bearing holding portion 521 side within the dimension range of the bearing holding portion 521.

As a result, rigidity of the periphery of the bearing holding portion 521, which is susceptible to vibration when the motor 40 rotates, can be enhanced. Therefore, vibration of the second housing 52 during rotation of the motor 40 can be reduced. Further, by forming the lower surface 524d of the coupling portion 524 in a curved shape, rigidity of the second housing 52 can be enhanced as compared with the case where the lower surface has a flat shape.

Although FIG. 8 illustrates an example in which the lower surface 524d of the coupling portion 524 is curved, the present invention is not limited thereto. For example, the upper surface 524c of the coupling portion 524 and the dimension of the coupling portion 524 in the axial direction may be curved so as to increase toward the end A2 on the bearing holding portion 521 side. In addition, both the upper surface 524c and the lower surface 524d of the coupling portion 524 may be curved.

As illustrated in FIG. 7A, assuming that a dimension in the circumferential direction, among the dimensions at the end portion of the coupling portion 524 on the stator holding portion 522 side, is a third dimension S3, the second dimension S2 is smaller than the third dimension S3.

As a result, it is possible to secure a large number of flow paths of the airflow 200 in the central portion of the motor 40 where heat is likely to be accumulated, and the airflow 200 easily flows in the central portion of the motor 40, so that the heat dissipation performance of the motor 40 can be improved.

Next, a specific configuration of the coupling portion 524 will be described. The coupling portion 524 includes a plurality of coupling members 5241 to 5243 and a plurality of through holes 524a and 524b. One end of each of the plurality of coupling members 5241 to 5243 is coupled to the stator holding portion 522, and the other end is coupled to the bearing holding portion 521. The plurality of coupling members 5241 to 5243 are provided side by side along the circumferential direction.

In the present embodiment, the plurality of coupling members 5241 to 5243 include the first coupling member 5241, the second coupling member 5242, and the third coupling member 5243. As illustrated in FIG. 7B, in a plan view of the second housing 52, the first coupling member 5241 is disposed on an imaginary straight line L1 linking the center of the stator holding portion 522 and the center of the bearing holding portion 521. Here, the center of the stator holding portion 522 is, for example, a center P1 of the through hole 522a of the stator holding portion 522. The center of the bearing holding portion 521 is, for example, a center P2 of the through hole 521a of the bearing holding portion 521.

By disposing one of the plurality of coupling members 5241 to 5243 on the imaginary straight line L1, rigidity of a portion of the coupling portion 524 that is most susceptible to vibration due to rotation of the motor 40 can be enhanced.

The second coupling member 5242 is disposed adjacent to the first coupling member 5241 on one side in the circumferential direction. The third coupling member 5243 is disposed adjacent to the first coupling member 5241 on the other side in the circumferential direction.

As illustrated in FIG. 7A, assuming that a dimension at the end on the stator holding portion 522 side is a fourth dimension S4 and a dimension at the end on the bearing holding portion 521 side is a fifth dimension S5 among the dimensions of the plurality of coupling members 5241 to 5243 in the circumferential direction, the fifth dimension S5 may be equal to or larger than the fourth dimension S4.

As a result, it is possible to easily send wind to the central portion of the motor 40, and to enhance the rigidity around the bearing holding portion 521.

As illustrated in FIG. 7A, assuming that a dimension in the circumferential direction of the first coupling member 5241 is a sixth dimension S6, the sixth dimension S6 may be larger than the fifth dimension S5 of the second coupling member 5242 or the third coupling member 5243.

As a result, the rigidity of the portion of the coupling portion 524 that is most susceptible to vibration due to the rotation of the motor 40 can be enhanced.

As illustrated in FIG. 6, in a plan view of the second housing 52, an imaginary straight line L2 passing through the center of the second coupling member 5242 and extending along the longitudinal direction of the second coupling member 5242 and an imaginary straight line L3 passing through the center of the third coupling member 5243 and extending along the longitudinal direction of the third coupling member 5243 intersect each other at a position farther from the coupling portion 524 than the center of the bearing holding portion 521.

If the imaginary straight line L2 and the imaginary straight line L3 intersect each other at a position closer to the coupling portion 524 than the center of the bearing holding portion 521, the circumferential dimension at the end portion of the coupling portion 524 on the bearing holding portion 521 side is not sufficient, and the rigidity of the second housing 52 may decrease. Therefore, as described above, by adopting a configuration in which the imaginary straight line L2 and the imaginary straight line L3 intersect each other at a position farther from the coupling portion 524 than the center of the bearing holding portion 521, the circumferential dimension at the end portion of the coupling portion 524 on the bearing holding portion 521 side increases, so that the rigidity of the second housing 52 can be enhanced.

As illustrated in FIGS. 7B and 8, the plurality of coupling members 5241 to 5243 have ribs 5241a to 5243a protruding from the end surface on the impeller 30 side among the axial end surfaces, respectively.

The rib 5241a of the first coupling member 5241 extends along the imaginary straight line L1. On the other hand, the rib 5242a of the second coupling member 5242 and the rib 5243a of the third coupling member 5243 extend in a direction in which the ribs are further away from the imaginary straight line L1 along the direction from the stator holding portion 522 side toward the bearing holding portion 521 side. Since the ribs 5241a to 5243a extend along the bending direction of the second housing 52 as described above, the second housing 52 has a shape resistant to bending, and the rigidity of the second housing 52 can be improved.

Assuming that a dimension in the longitudinal direction of the rib 5241a of the first coupling member 5241 is a seventh dimension S7 and a dimension in the longitudinal direction of the rib 5242a of the second coupling member 5242 or the rib 5243a of the third coupling member 5243 is an eighth dimension S8, the seventh dimension S7 may be larger than the eighth dimension S8. Assuming that a dimension in the circumferential direction of the rib 5241a of the first coupling member 5241 is a ninth dimension S9 and a dimension in the circumferential direction of the rib 5242a of the second coupling member 5242 or the rib 5243a of the third coupling member 5243 is a tenth dimension S10, the ninth dimension S9 may be larger than the tenth dimension S10. Moreover, as illustrated in FIG. 8, the axial dimension of the rib 5241a of the first coupling member 5241 may be larger than the axial dimension of the rib 5242a of the second coupling member 5242 or the rib 5243a of the third coupling member 5243.

As a result, the rigidity of the first coupling member 5241 that is susceptible to vibration due to the rotation of the motor 40 can be further enhanced.

As illustrated in FIGS. 7B and 9, the vertex V of the rib 5241a of the first coupling member 5241 in the axial direction may be shifted toward the board holding portion 523 side from the imaginary straight line L1. Since the stator holding portion 522 and the board holding portion 523 are arranged to be shifted in the circumferential direction, the center of gravity is located between the stator holding portion 522 and the board holding portion 523. When the vertex V of the rib 5241a is at a position close to the center of gravity, the second housing 52 is structurally stable, and the rigidity of the second housing 52 can be enhanced.

As illustrated in FIG. 7B, one end of the rib 5241a of the first coupling member 5241 in the direction along the imaginary straight line L1 may be located at the end of the first coupling member 5241 on the stator holding portion 522 side, and the other end may be located on the bearing holding portion 521 side with respect to the radial center P3 of the first coupling member 5241. Accordingly, the rigidity of the second housing 52 can be enhanced.

When the end surface of the coupling member 5241 to 5243 on the impeller 30 side is used as a reference, the protrusion height H1 of the ribs 5241a to 5243a is half or less of the protrusion height H2 of the stator holding portion 522. As a result, the stator 42 and the ribs 5241a to 5243a hardly interfere with each other. In addition, it is possible to reduce the height dimension of the motor 40 in the axial direction while maintaining the strength of the stator holding portion 522.

The plurality of through holes 524a and 524b are provided between the plurality of coupling members 5241 to 5243. Specifically, the through hole 524a is located between the coupling member 5241 and the coupling member 5243, and the through hole 524b is located between the coupling member 5241 and the coupling member 5242. As illustrated in FIG. 6, the dimensions of the plurality of through holes 524a and 524b in the circumferential direction decrease from the stator holding portion 522 side toward the bearing holding portion 521 side.

As described above, since the second housing 52 has the through holes 524a and 524b, the weight of the second housing 52 can be reduced. In addition, the airflow 200 can be smoothly circulated, and the heat dissipation performance of the motor 40 can be improved.

As described above, the board holding portion 523 is disposed at a position shifted in the circumferential direction with respect to the stator holding portion 522. As a result, the second housing 52 can be downsized as compared with the case where the board holding portion 523 and the stator holding portion 522 are arranged in the radial direction.

Figure 10:
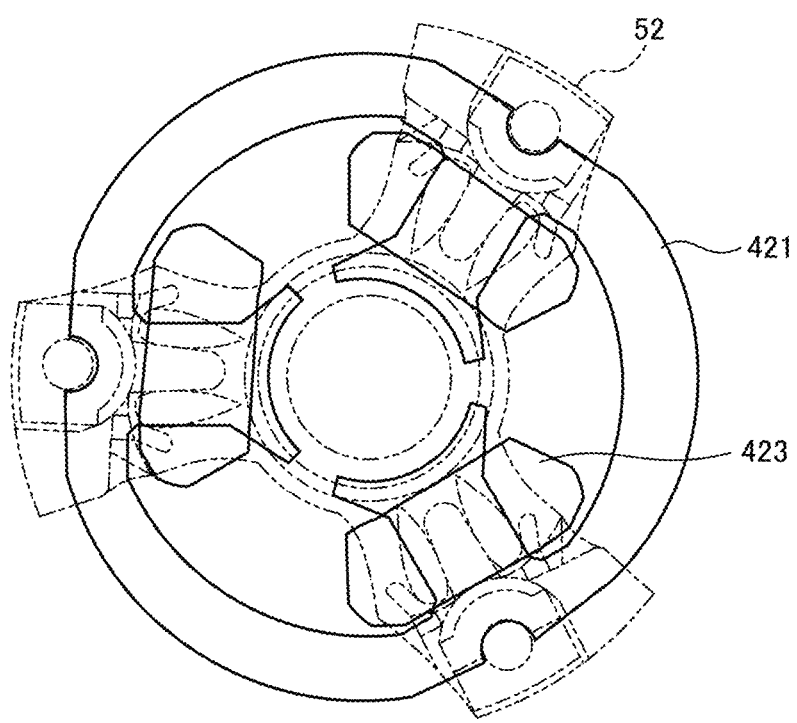
FIG. 10 is a plan view illustrating an exemplary configuration of the second housing, a stator core, and a coil according to the embodiment.

Next, a positional relationship among the second housing 52, the stator core 421, and the coil 423 according to the embodiment will be described with reference to FIG. 10. FIG. 10 is a plan view illustrating an example of a configuration of the second housing 52, the stator core 421, and the coil 423 according to the embodiment.

As illustrated in FIG. 10, in a plan view of the second housing 52, the coupling portion 524 may overlap the teeth 4212 (see FIG. 3) and the coils 423 of the stator core 421. In other words, the coupling portion 524 is provided so as not to overlap with the slot between the teeth 4212 of the stator core 421.

As a result, the airflow 200 (see FIG. 2) is less likely to be blocked by the coupling portion 524, and the heat dissipation performance of the motor 40 can be improved.

As described above, in the second housing 52 according to the embodiment, assuming that the dimension in the axial direction is the first dimension S1 and the dimension in the circumferential direction is the second dimension S2 among the dimensions at the end portion of the coupling portion 524 on the bearing holding portion 521 side, the first dimension S1 is smaller than the second dimension S2. In addition, the second housing 52 in the embodiment has a portion in which the dimension in the axial direction of the coupling portion 524 is smaller than the first dimension S1.

As described above, by relatively increasing the first dimension S1, it is possible to improve the strength on the bearing holding portion 521 side that is susceptible to vibration when the motor 40 rotates, and it is possible to reduce vibration when the motor 40 rotates. Therefore, it is possible to enhance the cooling effect of the motor 40 while securing the rigidity of the second housing 52. In addition, by providing a portion where the dimension in the axial direction is smaller than the first dimension S1 in the coupling portion 524, the weight of the second housing 52 can be reduced as compared with the case where the dimension in the axial direction is unified to the first dimension S1. Further, by making the first dimension S1 smaller than the second dimension S2, the height dimension of the second housing 52 can be suppressed.

Figure 11:
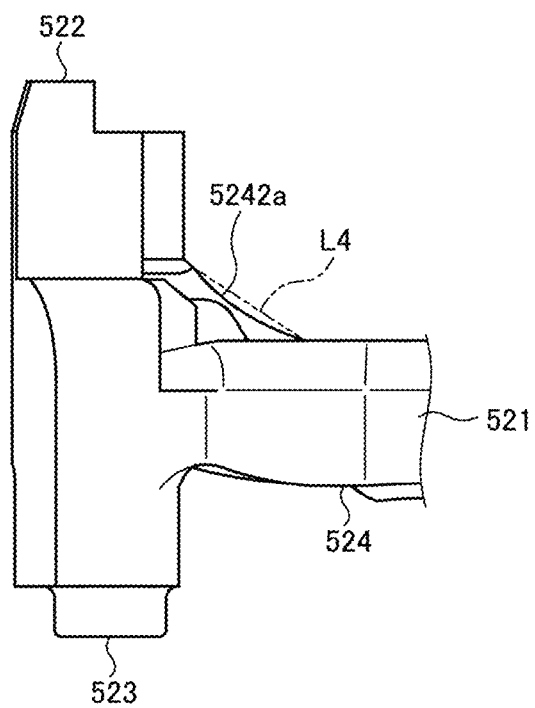
FIG. 11 is a side view of a coupling member of a second housing according to a modification.

FIG. 11 is a side view of the coupling member 5242 of the second housing 52 according to a modification. As illustrated in FIG. 11, the rib 5242a of the coupling member 5242 may be recessed with respect to a line L4 connecting both ends of the end surface located on the impeller 30 side of the rib 5242a.

As a result, the rib 5242a is less likely to interfere with the stator 42 as compared with the rib 5242a (see FIG. 5) of the coupling member 5242 in the second housing 52 according to the embodiment. In addition, as compared with the second housing 52 according to the embodiment, the weight of the second housing 52 can be further reduced.

Further, the rib 5241a may extend between an end of the coupling member 5241 on the stator holding portion 522 side and an end of the coupling member on the bearing holding portion 521 side. Accordingly, the rigidity of the second housing 52 can be enhanced.

Although the embodiment of the present invention has been described above, the present invention is not limited to the above-described embodiment, and various modifications can be made without departing from the gist thereof.

Further effects and modifications can be easily derived by those skilled in the art. Thus, the broader aspects of the present invention are not limited to the specific details and the representative embodiment presented and described above. Accordingly, various changes may be made without departing from the spirit or scope of the general inventive concept as defined by the appended claims and their equivalents.

Note that the present technique can have the following configurations.

(1)
A blower comprising:
a motor including a rotor having a shaft, and a stator disposed on a radially outer side the rotor;
an impeller that is connected to the shaft and rotates about the shaft;
a first housing disposed between the motor and the impeller; and
a second housing disposed on a side opposite to the first housing across the motor;
wherein
the second housing includes:
a bearing holding portion that holds a bearing of the shaft;
a stator holding portion that is disposed on an outer side of the bearing holding portion in a radial direction of the shaft, and holds the stator; and
a coupling portion that couples the bearing holding portion and the stator holding portion;
assuming that a dimension in an axial direction of the shaft is a first dimension and a dimension in a circumferential direction of the shaft is a second dimension among dimensions at an end portion of the coupling portion on a bearing holding portion side, the first dimension is smaller than the second dimension, and
the coupling portion has a portion whose dimension in the axial direction is smaller than the first dimension.

(2)
The blower according to (1), wherein
the dimension of the coupling portion in the axial direction increases toward the end portion on the bearing holding portion side.

(3)
The blower according to (1) or (2), wherein
one surface or another surface of the coupling portion in the axial direction is curved such that the dimension of the coupling portion in the axial direction increases toward the end portion on the bearing holding portion side within a dimension range of the bearing holding portion in the axial direction.

(4)
The blower according to any one of (1) to (3), wherein assuming that a dimension in the circumferential direction is a third dimension among dimensions at an end portion of the coupling portion on a stator holding portion side, the second dimension is smaller than the third dimension.

(5)
The blower according to any one of (1) to (4), wherein the coupling portion includes a plurality of coupling members in each of which one end is coupled to the stator holding portion and another end is coupled to the bearing holding portion, and
assuming that, among dimensions of each of the plurality of coupling members in the circumferential direction, a dimension at an end portion on a stator holding portion side is a fourth dimension and a dimension at an end portion on the bearing holding portion side is a fifth dimension, the fifth dimension is equal to or larger than the fourth dimension.

(6)
The blower according to any one of (1) to (5), wherein the coupling portion includes a plurality of coupling members in each of which one end is coupled to the stator holding portion and another end is coupled to the bearing holding portion, and
in a plan view of the second housing, one of the plurality of coupling members is disposed on an imaginary straight line connecting a center of the stator holding portion and a center of the bearing holding portion.

(7)
The blower according to (6), wherein
a dimension in the circumferential direction of one of the coupling members arranged on the imaginary straight line is larger than a dimension in the circumferential direction of another of the coupling members.

(8)
The blower according to (6) or (7), wherein
the plurality of coupling members include:
a first coupling member disposed on the imaginary straight line;
a second coupling member disposed adjacent to the first coupling member on one side in the circumferential direction; and
a third coupling member disposed adjacent to the first coupling member on another side in the circumferential direction, and
in a plan view of the second housing, an imaginary straight line passing through a center of the second coupling member and extending along a longitudinal direction of the second coupling member and an imaginary straight line passing through a center of the third coupling member and extending along a longitudinal direction of the third coupling member intersect each other at a position farther from the coupling portion than a center of the bearing holding portion.

(9)
The blower according to any one of (6) to (8), wherein
each of the plurality of coupling members includes a rib protruding from an end surface on an impeller side among end surfaces in the axial direction, and
a dimension in a longitudinal direction of the rib of the coupling member arranged on the imaginary straight line is larger than a dimension in the longitudinal direction of the rib of another coupling member.

(10)
The blower according to any one of (6) to (9), wherein
each of the plurality of coupling members includes a rib protruding from an end surface on an impeller side among end surfaces in the axial direction, and
a dimension in the circumferential direction of the rib of the coupling member disposed on the imaginary straight line is larger than a dimension in the circumferential direction of the rib of another coupling member.

(11)
The blower according to any one of (6) to (10), wherein
each of the plurality of coupling members includes a rib protruding from an end surface on an impeller side among end surfaces in the axial direction,
the plurality of coupling members include:
a first coupling member disposed on the imaginary straight line;
a second coupling member disposed adjacent to the first coupling member on one side in the circumferential direction; and
a third coupling member disposed adjacent to the first coupling member on another side in the circumferential direction,
the rib of the first coupling member extends along the imaginary straight line, and
the rib of the second coupling member and the rib of the third coupling member extend in a direction in which the ribs are further away from the imaginary straight line along the direction from a stator holding portion side toward the bearing holding portion side.

(12)
The blower according to any one of (9) to (11), wherein
a protruding height of the rib based on the end surface on the impeller side of the coupling member is equal to or less than a half of a protruding height of the stator holding portion based on the end surface on the impeller side of the coupling member.

(13)
The blower according to any one of (1) to (12), further comprising
a circuit board positioned on a side opposite to the motor across the second housing, wherein
the second housing includes a board holding portion that holds the circuit board, and
the board holding portion is disposed at a position shifted from the stator holding portion in the circumferential direction.

(14)
The blower according to (13), wherein
the coupling portion includes a plurality of coupling members having one end coupled to the stator holding portion and another end coupled to the bearing holding portion,
the plurality of coupling members includes:
a first coupling member disposed on an imaginary straight line connecting a center of the stator holding portion and a center of the bearing holding portion in a plan view of the second housing;
a second coupling member disposed adjacent to the first coupling member on one side in the circumferential direction; and
a third coupling member disposed adjacent to the first coupling member on another side in the circumferential direction,
each of the first coupling member, the second coupling member, and the third coupling member has a rib protruding from an end surface on an impeller side among end surfaces in the axial direction, and a vertex of the rib of the first coupling member in the axial direction is shifted toward the board holding portion side with respect to the imaginary straight line in a plan view of the second housing.

(15)

The blower according to any one of (6) to (14), wherein each of the plurality of coupling members includes a rib protruding from an end surface on an impeller side among the end surfaces in the axial direction, and in the rib included in the coupling member disposed on the imaginary straight line, one end in a direction along the imaginary straight line is located at an end portion of the coupling member on a stator holding portion side, and another end is located on the bearing holding portion side with respect to a radial center of the coupling member.

(16)

The blower according to any one of (6) to (15), wherein each of the plurality of coupling members includes a rib protruding from an end surface on an impeller side among the end surfaces in the axial direction, and the rib included in the coupling member disposed on the imaginary straight line extends between an end portion of the coupling member on a stator holding portion side and an end portion of the coupling member on the bearing holding portion side.

(17)

The blower according to any one of (6) to (16), wherein each of the plurality of coupling members includes a rib protruding from an end surface on an impeller side among the end surfaces in the axial direction, and the rib included in the coupling member disposed on the imaginary straight line is recessed from a line connecting both ends of the end surface on the impeller side of the rib, in a side view of the coupling member.

(18)

The blower according to any one of (1) to (17), wherein the stator includes:
 a core back in a cylindrical shape;
 a plurality of teeth extending radially inward from the core back and arranged at equal intervals in a circumferential direction; and
 a coil wound around the teeth, and
the coupling portion overlaps the teeth and the coil in a plan view of the second housing.

(19)

The blower according to any one of (1) to (18), further comprising
 a flow path forming member that surrounds a radially outer side of the impeller and the first housing, has an intake port at an end on one side in the axial direction, and has an exhaust port at an end on another side, wherein
the stator includes:
 a core back in a cylindrical shape; and
 a plurality of teeth extending radially inward from the core back and arranged at equal intervals in a circumferential direction,
the second housing includes a plurality of the coupling portions arranged side by side in the circumferential direction at intervals, and
with rotation of the impeller, an airflow that flows in from the intake port and is discharged from the exhaust port is formed, and an airflow that flows in from a gap between the coupling portions and flows out from a gap between the stator and the first housing through a gap between the teeth is formed.

(20)

A vacuum cleaner comprising
the blower according to any one of (1) to (19).

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A blower comprising:
   a motor including a rotor having a shaft, and a stator disposed on a radially outer side the rotor;
   an impeller that is connected to the shaft and rotates about the shaft;
   a first housing disposed between the motor and the impeller; and
   a second housing disposed on a side opposite to the first housing across the motor;
   wherein
   the second housing includes:
     a bearing holding portion that holds a bearing of the shaft;
     a stator holding portion that is disposed on an outer side of the bearing holding portion in a radial direction of the shaft, and holds the stator; and
     a coupling portion that couples the bearing holding portion and the stator holding portion;
   assuming that a dimension in an axial direction of the shaft is a first dimension and a dimension in a circumferential direction of the shaft is a second dimension among dimensions at an end portion of the coupling portion on a bearing holding portion side, the first dimension is smaller than the second dimension, and
   the coupling portion has a portion whose dimension in the axial direction is smaller than the first dimension, wherein the dimension of the coupling portion in the axial direction adjacent to the bearing holding portion side is greater than the dimension of the coupling portion in the axial direction distal from the bearing holding portion.

2. The blower according to claim 1, wherein
one surface or another surface of the coupling portion in the axial direction is curved such that the dimension of the coupling portion in the axial direction increases toward the end portion on the bearing holding portion side within a dimension range of the bearing holding portion in the axial direction.

3. The blower according to claim 1, wherein
assuming that a dimension in the circumferential direction is a third dimension among dimensions at an end portion of the coupling portion on a stator holding portion side, the second dimension is smaller than the third dimension.

4. The blower according to claim 3, wherein
the coupling portion includes a plurality of coupling members in each of which one end is coupled to the stator holding portion and another end is coupled to the bearing holding portion, and
assuming that, among dimensions of each of the plurality of coupling members in the circumferential direction, a dimension at an end portion on the stator holding portion side is a fourth dimension and a dimension at an end portion on the bearing holding portion side is a fifth dimension, the fifth dimension is equal to or larger than the fourth dimension.

5. The blower according to claim 1, wherein
the coupling portion includes a plurality of coupling members in each of which one end is coupled to the stator holding portion and another end is coupled to the bearing holding portion, and
in a plan view of the second housing, one of the plurality of coupling members is disposed on an imaginary straight line connecting a center of the stator holding portion and a center of the bearing holding portion.

6. The blower according to claim 5, wherein
a dimension in the circumferential direction of one of the coupling members arranged on the imaginary straight line is larger than a dimension in the circumferential direction of another of the coupling members.

7. The blower according to claim 5, wherein
the plurality of coupling members include:
   a first coupling member disposed on the imaginary straight line;
   a second coupling member disposed adjacent to the first coupling member on one side in the circumferential direction; and
   a third coupling member disposed adjacent to the first coupling member on another side in the circumferential direction, and
in a plan view of the second housing, an imaginary straight line passing through a center of the second coupling member and extending along a longitudinal direction of the second coupling member and an imaginary straight line passing through a center of the third coupling member and extending along a longitudinal direction of the third coupling member intersect each other at a position farther from the coupling portion than a center of the bearing holding portion.

8. The blower according to claim 5, wherein
each of the plurality of coupling members includes a rib protruding from an end surface on an impeller side among end surfaces in the axial direction, and
a dimension in a longitudinal direction of the rib of the coupling member disposed on the imaginary straight line is larger than a dimension in the longitudinal direction of the rib of another coupling member.

9. The blower according to claim 8, wherein
a protruding height of the rib based on the end surface on the impeller side of the coupling member is equal to or less than a half of a protruding height of the stator holding portion based on the end surface on the impeller side of the coupling member.

10. The blower according to claim 5, wherein
each of the plurality of coupling members includes a rib protruding from an end surface on an impeller side among end surfaces in the axial direction, and
a dimension in the circumferential direction of the rib of the coupling member disposed on the imaginary straight line is larger than a dimension in the circumferential direction of the rib of another coupling member.

11. The blower according to claim 5, wherein
each of the plurality of coupling members includes a rib protruding from an end surface on an impeller side among end surfaces in the axial direction,
the plurality of coupling members include:
   a first coupling member disposed on the imaginary straight line;
   a second coupling member disposed adjacent to the first coupling member on one side in the circumferential direction; and
   a third coupling member disposed adjacent to the first coupling member on another side in the circumferential direction,
the rib of the first coupling member extends along the imaginary straight line, and
the rib of the second coupling member and the rib of the third coupling member extend in a direction in which the ribs are further away from the imaginary straight line along the direction from a stator holding portion side toward the bearing holding portion side.

12. The blower according to claim 5, wherein
each of the plurality of coupling members includes a rib protruding from an end surface on an impeller side among end surfaces in the axial direction, and
in the rib included in the coupling member disposed on the imaginary straight line, one end in a direction along the imaginary straight line is located at an end portion of the coupling member on a stator holding portion side, and another end is located on the bearing holding portion side with respect to a radial center of the coupling member.

13. The blower according to claim 5, wherein
each of the plurality of coupling members includes a rib protruding from an end surface on an impeller side among end surfaces in the axial direction, and
the rib included in the coupling member disposed on the imaginary straight line extends between an end portion of the coupling member on a stator holding portion side and an end portion of the coupling member on the bearing holding portion side.

14. The blower according to claim 5, wherein
each of the plurality of coupling members includes a rib protruding from an end surface on an impeller side among end surfaces in the axial direction, and
the rib included in the coupling member disposed on the imaginary straight line is recessed from a line connecting both ends of the end surface on the impeller side of the rib, in a side view of the coupling member.

15. The blower according to claim 1, further comprising
a circuit board positioned on a side opposite to the motor across the second housing, wherein
the second housing includes a board holding portion that holds the circuit board, and
the board holding portion is disposed at a position shifted from the stator holding portion in the circumferential direction.

16. The blower according to claim 15, wherein
the coupling portion includes a plurality of coupling members in each of which one end is coupled to the stator holding portion and another end is coupled to the bearing holding portion,
the plurality of coupling members includes:
   a first coupling member disposed on an imaginary straight line connecting a center of the stator holding portion and a center of the bearing holding portion in a plan view of the second housing;
   a second coupling member disposed adjacent to the first coupling member on one side in the circumferential direction; and
   a third coupling member disposed adjacent to the first coupling member on another side in the circumferential direction,
each of the first coupling member, the second coupling member, and the third coupling member has a rib protruding from an end surface on an impeller side among end surfaces in the axial direction, and a vertex of the rib of the first coupling member in the axial direction is shifted toward the board holding portion side with respect to the imaginary straight line in a plan view of the second housing.

17. The blower according to claim 1, wherein the stator includes:

a core back in a cylindrical shape;

a plurality of teeth extending radially inward from the core back and arranged at equal intervals in a circumferential direction; and a coil wound around the teeth, and the coupling portion overlaps the teeth and the coil in a plan view of the second housing.

18. The blower according to claim 1, further comprising a flow path forming member that surrounds a radially outer side of the impeller and the first housing, has an intake port at an end on one side in the axial direction, and has an exhaust port at an end on another side, wherein the stator includes:

a core back in a cylindrical shape; and a plurality of teeth extending radially inward from the core back and arranged at equal intervals in a circumferential direction, the second housing includes a plurality of the coupling portions arranged side by side in the circumferential direction at intervals, and with rotation of the impeller, an airflow that flows in from the intake port and is discharged from the exhaust port is formed, and an airflow that flows in from a gap between the coupling portions and flows out from a gap between the stator and the first housing through a gap between the teeth is formed.

19. A vacuum cleaner comprising the blower according to claim 1.

* * * * *